US012048357B2

(12) United States Patent
Jang et al.

(10) Patent No.: US 12,048,357 B2
(45) Date of Patent: Jul. 30, 2024

(54) THREE-DIMENSIONAL OUT SOLE HAVING IMPROVED PATTERN QUALITY AND DURABILITY, AND SHOE COMPRISING SAME

(71) Applicant: ASSEMS INC., Busan (KR)

(72) Inventors: Ji-Sang Jang, Busan (KR); Jae-Jeong Lee, Busan (KR); Kyoung Kyu Kim, Busan (KR); Kyung-Seok Choi, Busan (KR); Chi-Kyun Park, Busan (KR); Yong-Hoon Park, Gimhae-si (KR)

(73) Assignee: ASSEMS INC., Busan (KR)

( * ) Notice: Subject to any disclaimer, the term of this patent is extended or adjusted under 35 U.S.C. 154(b) by 260 days.

(21) Appl. No.: 17/764,817

(22) PCT Filed: Oct. 21, 2020

(86) PCT No.: PCT/KR2020/014436
§ 371 (c)(1),
(2) Date: Mar. 29, 2022

(87) PCT Pub. No.: WO2021/080329
PCT Pub. Date: Apr. 29, 2021

(65) Prior Publication Data

US 2022/0386744 A1 Dec. 8, 2022

(30) Foreign Application Priority Data

Oct. 23, 2019 (KR) ........................ 10-2019-0132157

(51) Int. Cl.
*A43D 8/22* (2006.01)
*A43B 5/00* (2022.01)
(Continued)

(52) U.S. Cl.
CPC ................ *A43D 8/22* (2013.01); *A43B 5/002* (2013.01); *A43B 5/02* (2013.01); *A43B 13/026* (2013.01);
(Continued)

(58) Field of Classification Search
CPC ...... A43D 8/22; A43D 2200/00; A43D 95/06; A43D 8/16; A43B 5/002; A43B 5/02;
(Continued)

(56) References Cited

U.S. PATENT DOCUMENTS 10,160,244 B1 * 12/2018 Whitt .................. B41M 5/0358
2004/0093763 A1 5/2004 Cheng
2019/0313744 A1 10/2019 Shiao

FOREIGN PATENT DOCUMENTS

JP S51-107452 U1 8/1976
JP S57-047902 U 3/1982
(Continued)

OTHER PUBLICATIONS

European Search Report for related EP Application No. 20880032.6 mailed Feb. 16, 2023 from European Patent Office.
(Continued)

*Primary Examiner* — Bradley W Thies
(74) *Attorney, Agent, or Firm* — Paratus Law Group, PLLC

(57) ABSTRACT

A three-dimensional out sole having a pattern having improved quality and durability has a dye permeated into the surface of the outsole. A depth to which the dye penetrating the micropores is 0.08 mm to 0.12 mm. The dye is permeated into the microspores through vacuum suction. The dye is digitally printed on a thermoplastic sheet. The thermoplastic sheet on which the dye is printed is heated to be softened with flexibility. The softened sheet having flexibility is closely attached to a surface of the shoe outsole having
(Continued)

the three-dimensional shape through vacuum adsorption and then is permeated therein.

1 Claim, 3 Drawing Sheets

(51) Int. Cl.

| | |
|---|---|
| ***A43B 5/02*** | (2006.01) |
| ***A43B 13/02*** | (2022.01) |
| ***A43B 13/22*** | (2006.01) |
| ***A43B 23/08*** | (2006.01) |
| ***B41M 1/40*** | (2006.01) |
| ***B41M 5/00*** | (2006.01) |
| ***B41M 5/025*** | (2006.01) |
| ***B41M 5/03*** | (2006.01) |
| ***B41M 5/382*** | (2006.01) |
| ***B41M 7/00*** | (2006.01) |

(52) U.S. Cl.
CPC ............ *A43B 13/223* (2013.01); *A43B 23/08* (2013.01); *B41M 1/40* (2013.01); *B41M 5/0011* (2013.01); *B41M 5/0256* (2013.01); *B41M 5/03* (2013.01); *B41M 5/38242* (2013.01); *B41M 7/009* (2013.01); *A43D 2200/00* (2013.01)

(58) Field of Classification Search
CPC ..... A43B 13/026; A43B 13/223; A43B 23/08; A43B 1/0027; A43B 1/0072; A43B 5/00; B41M 1/40; B41M 5/0011; B41M 5/0256; B41M 5/03; B41M 5/38242; B41M 7/009; B41M 5/035; B41M 1/30; B41M 5/382; B05D 7/22
See application file for complete search history.

(56) References Cited

FOREIGN PATENT DOCUMENTS

| | | | |
|---|---|---|---|
| JP | H11-227147 | A | 8/1999 |
| JP | 2001-314537 | A | 11/2001 |
| JP | 2004-098583 | A | 4/2004 |
| JP | 2010-181700 | A | 8/2010 |
| KR | 10-2001-0000538 | A | 1/2001 |
| KR | 10-2002-0078676 | A | 10/2002 |
| KR | 10-2006-0038971 | A | 5/2006 |
| KR | 10-2007-0101707 | A | 10/2007 |
| KR | 10-2012-0099386 | A | 9/2012 |
| KR | 10-2012-0139254 | A | 12/2012 |
| KR | 10-1833986 | B1 | 3/2018 |
| KR | 10-1979862 | B1 | 5/2019 |
| WO | WO 2008/056521 | A1 | 5/2008 |
| WO | WO 2018/202196 | A1 | 11/2018 |

OTHER PUBLICATIONS

Japanese Office Action for related JP Application No. 2022-522060 mailed Apr. 18, 2023 from Japanese Patent Office.
International Search Report for PCT/KR2020/014436 mailed Jan. 22, 2021 from Korean Intellectual Property Office.

* cited by examiner

THREE-DIMENSIONAL OUT SOLE HAVING IMPROVED PATTERN QUALITY AND DURABILITY, AND SHOE COMPRISING SAME

CROSS-REFERENCE TO PRIOR APPLICATIONS

This application is a National Stage Patent Application of PCT International Patent Application No. PCT/KR2020/014436 (filed on Oct. 21, 2020) under 35 U.S.C. § 371, which claims priority to Korean Patent Application No. 10-2019-0132157 (filed on Oct. 23, 2019), which are all hereby incorporated by reference in their entirety.

BACKGROUND

The present disclosure relates to a shoe outsole, and more particularly, to a three-dimensional outsole having a pattern with improved quality and durability, and a shoe comprising same.

Various patterns (patterns, images, shapes, etc.) are formed on the outsole, which is one of the components constituting the shoe, to beautifully decorate the exterior. Korean Patent Application Publication No. 10-2002-0078676 (titled "EVA SHOES PLATE HAVING PRINTING LAYER") discloses a technique for attaching a film having a pattern formed therein to the outsole. In addition, Korean Patent Application Publication No. 10-2001-0000538 (titled "INSOLES FOR SHOES DRAFT MANIFESTATION METHOD") discloses a technique for painting a pattern on the outsole.

However, in a case where a film is attached or paint is applied to form a pattern on the outsole as described above, the film or paint may be peeled off as the film or paint is used over time after a user starts wearing shoes.

In addition, in such a case where a film is attached or paint is applied to form a pattern on the outsole, a beautiful pattern is not formed, which may degrade aesthetics from a perspective of the user.

SUMMARY

The present disclosure provides a three-dimensional outsole having a pattern with improved quality and durability and a shoe including the outsole, the outsole which is capable of preventing the pattern from being worn off or damaged while improving aesthetics from a perspective of a user.

In an aspect, a three-dimensional outsole having improved pattern quality and durability is provided, and a pattern which is formed in the outsole in a manner in which dye is permeated into micropores formed in an inner or outer surface of a shoe outsole having a three-dimensional shape and then is fixed therein.

In this case, depth to which the dye penetrating the micropores and then is fixed may be 0.08 mm to 0.12 mm.

Further, the dye may be permeated into the micropores through vacuum suction.

Further, the dye may be digitally printed on a thermoplastic sheet, the thermoplastic sheet on which the dye may be printed is heated to be softened with flexibility, and the softened sheet having flexibility may be closely attached to a surface of the shoe outsole having the three-dimensional shape through vacuum adsorption and then be permeated therein.

In another aspect, a method of manufacturing an outsole of a three-dimensional shape with improved pattern quality and durability is provided. The method includes printing a sheet, softening the sheet, vacuum-suctioning an outsole of the softened sheet, and fixing a pattern on the outsole.

In yet another aspect, an outsole of a three-dimensional shape having improved pattern quality and durability according to the present disclosure includes any one of the above.

In the three-dimensional outsole having improved pattern quality and durability according to a preferred embodiment of the present disclosure, the pattern of the outsole is formed beautiful in three-dimension since dye is permeated into a surface of the outsole and then is fixed therein.

In addition, in the three-dimensional outsole having improved pattern quality and durability according to a preferred embodiment of the present disclosure, a softened sheet is attached through vacuum to the outsole having a three-dimensional shape in close contact to match the shape of the outsole, thereby further increasing the quality of the pattern and the effect of forming the pattern.

DETAILED DESCRIPTION

Figure 1:
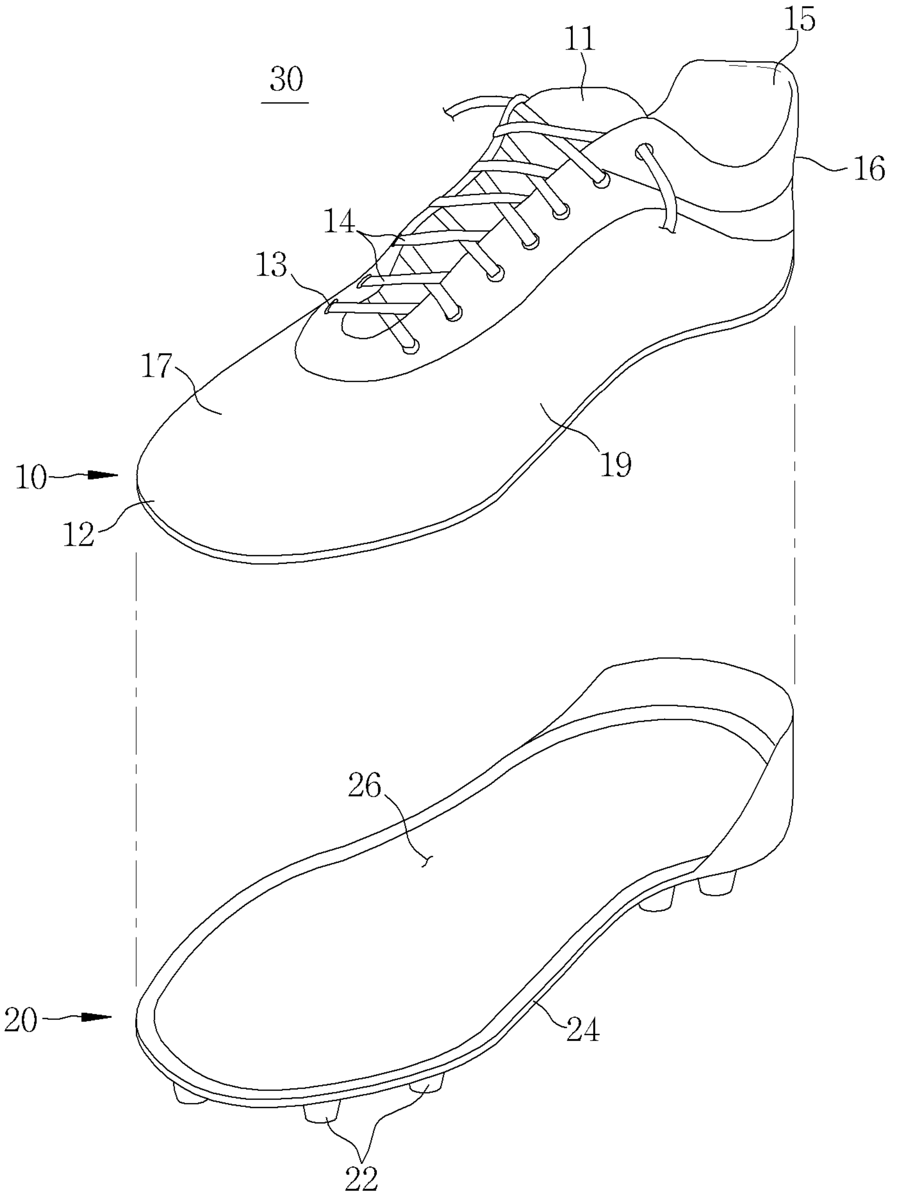
FIG. 1 is a reference view illustrating a configuration of a shoe to which a preferred embodiment of the present disclosure is applied.

Before describing embodiments according to the present disclosure in detail, the present disclosure is not limited to the configurations shown in the following detailed description or the accompanying drawings, and the present disclosure may be used or carried out in various ways.

It should be also noted that expressions or terms used herein are merely used for explanation, but not to limit the present disclosure.

That is, unless otherwise indicated as different meanings, expressions "mounted," "installed," "accessed," "connected," "supported," "coupled", and the like are used as broad expressions including both direct and indirect mounting, installation, access, connection, support, and coupling. Expressions "accessed", "connected", and "coupled" are not limited to physical or mechanical access, connection, or coupling.

In addition, in this specification, terms indicating a direction such as upper, lower, downward, upward, rearward, bottom, front, rear, and the like are used to describe the drawings, but these terms are merely used to indicate a relative direction (when normally viewed) in the drawings for convenience of explanation. Such terms indicating directions should not be interpreted as literally limiting or restricting the present disclosure.

In addition, terms such as "first", "second", "third", and the like used herein are for illustrative purposes only and should not be considered as implying relative importance.

Hereinafter, embodiments of the present disclosure will be described in detail with reference to the accompanying drawings.

FIG. 1 is a reference view illustrating a configuration of a shoe to which a preferred embodiment of the present disclosure is applied. A three-dimensional outsole (hereinafter, referred to as "outsole") having a pattern with improved quality and durability according to a preferred embodiment of the present disclosure is applicable to various shoes such as a sports shoe, a hiking shoe and a soccer shoe, but the outsole is most preferably applicable to a soccer shoe 30 as shown in FIG. 1.

In the case of the soccer shoe 30, studs 22 are attached in three dimensions in order to improve athletic performance and safety of a soccer player who is wearing the shoe during a strenuous soccer game. In addition, unlike a general shoe having elasticity, the soccer shoe includes an outsole 20 formed of a hard plastic material.

That is, the soccer shoe 30 generally includes an upper 10, which is the upper part, and an outsole 20, which is the base as shown in FIG. 1.

The upper 10 includes a toecap 12, a vamp 17, a lace loop 13, a shoelace 14, a tongue 11, a quarter 19, a topline 15, and a counter.

The toe cap 12 is a part that covers the toes, the vamp 17 is a part that covers the front of the foot, and the quarter 19 is a part that covers the back of the heel while reinforcing the instep.

In addition, the tongue 11 is a fastening part when a user is wearing a shoe, which prevents the foot from being rubbed by shoelaces, the top line 15 is a part corresponding to the entrance of the shoe, and the counter 16 is a part that reinforces the heel part.

The lace loop 13 is a hole into which a shoelace 14 enters.

The outsole 20 is a part where a bottom 24 is in contact with the ground. The outsole 20 includes studs 22 that protrude from the bottom 24 of the outsole 20 to spike in the ground to increase adhesion with the ground.

The stud 22 may be also formed integrally with the outsole 20. Depending on a user's selection, a coupling hole having a screw thread for coupling to the stud 22 is provided in the bottom 24 of the outsole 20 so that the stud 22 can be coupled to the outsole 20.

Therefore, as shown in FIG. 1, it is difficult to form a pattern on the outsole 20 of the soccer shoe because the inner and outer surfaces of the outsole 20 have a three-dimensional shape and are formed of a hard plastic material, unlike a general shoe outsole having a flat shape. In addition, even if the pattern is formed with a film or paint, the attached or painted pattern may be peeled off or damaged due to the use environment of a soccer player who vigorously plays a game.

Accordingly, the present disclosure provides an outsole 20 having the three-dimensional inner and outer surfaces, formed of a hard plastic material, and capable of maintaining the stylishy appearance with a pattern that is not peeled off or damaged even during strenuous sports, and a shoe 30 including the outsole 20.

Figure 2:
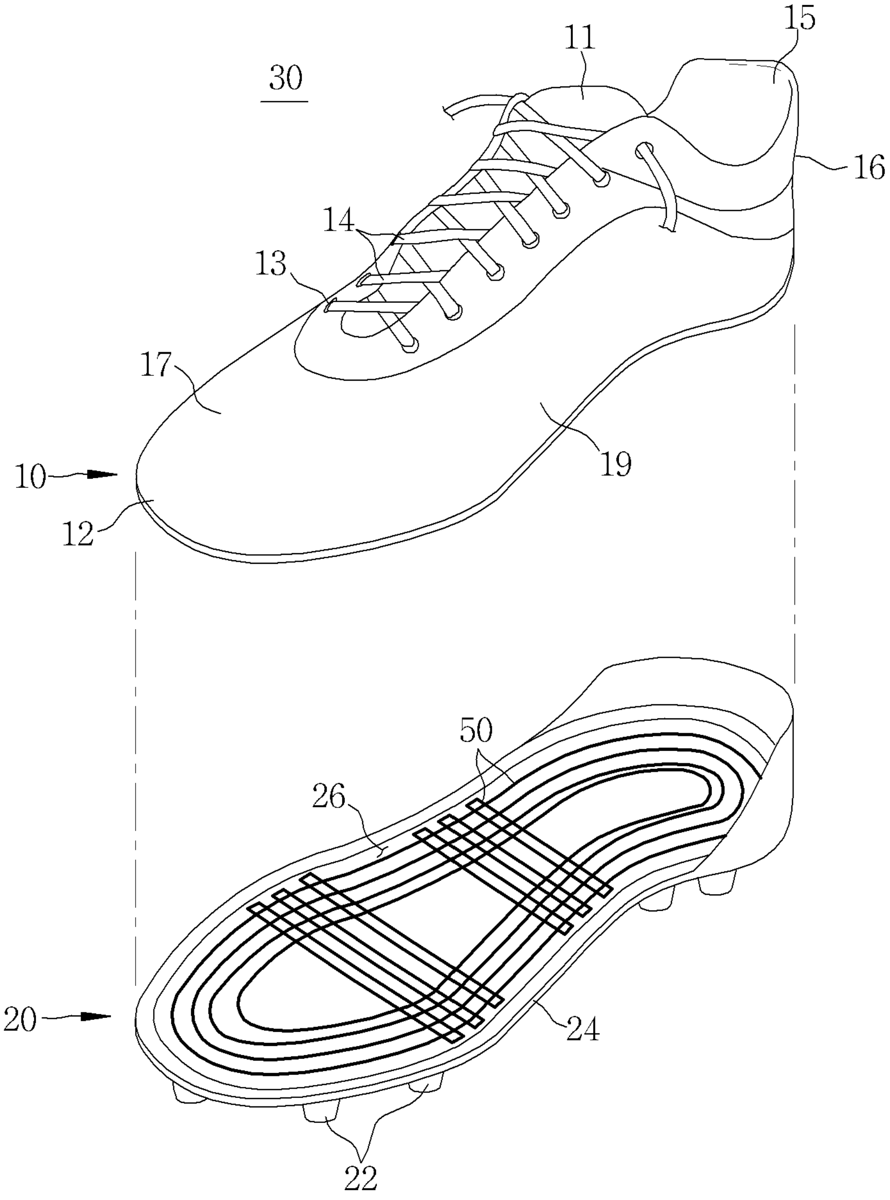
FIG. 2 is a reference view illustrating a state in which a pattern with improved quality and durability is formed in an outsole having a three-dimensional shape according to a preferred embodiment of the present disclosure.
Figure 3:
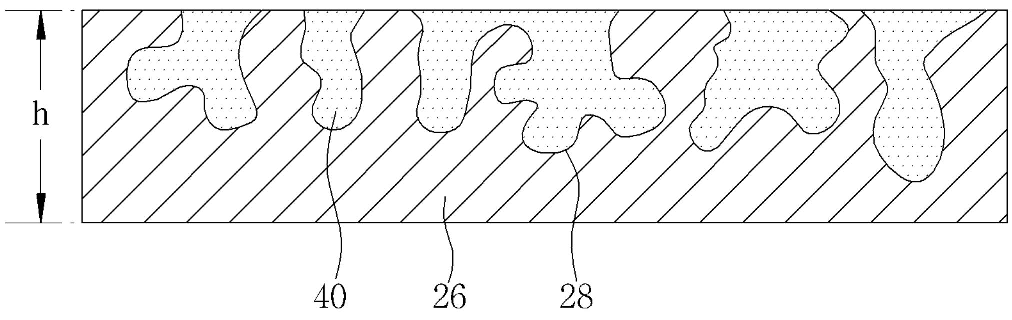
FIG. 3 is a cross-sectional view illustrating a state in which pattern dye has transferred into surface pores of an outsole having a three-dimensional shape according to a preferred embodiment of the present disclosure and then is permeated therein.

FIG. 2 is a reference view illustrating a state in which a pattern 50 with improved quality and durability is formed in the outsole 20 having a three-dimensional shape according to a preferred embodiment of the present disclosure. As shown in FIG. 3, dye 40 is permeated into pores 28 on a surface of the outsole 20 having the three-dimensional shape and then is fixed to form a pattern integrally with the outsole 20.

That is, the dye 40 is permeated into the surface of the outsole 20 through micropores on the surface of the outsole 20 and then is fixed therein to form a pattern.

Therefore, in the shoe 30 according to the preferred embodiment of the present disclosure, even if the surface of the outsole 20 is worn out, the pattern may be maintained beautifully because the dye 40 is permeated into the surface of the outsole 20 and then is fixed thereto.

In this case, a depth h to which the dye 40 is permeated into the inside of the outsole 20 through the micropores on the surface of the outsole 20 is preferably 0.08 mm to 0.12 mm from the surface of the outsole 20.

This is because, when the depth is less than 0.08 mm, the pattern or color may be partially damaged as the surface of the outsole 20 is worn out, or the color desired by the user may not appear due to the low penetration depth. In addition, when the penetration depth of the dye is 0.12 mm or more, a high pressure or temperature is required for the dye to be permeated by 0.12 mm or more, and this may cause reduction of product productivity and deterioration of the quality of the outsole 20 formed of hard plastic.

In addition, the outsole 20 according to a preferred embodiment of the present disclosure is formed of a transparent or translucent material, and the micropores 28 three-dimensionally interconnected are formed in the surface of the transparent or translucent outsole 20.

Accordingly, the dye 40 is permeated into and is fixed to the micropores 28 three-dimensionally interconnected to form a pattern. Therefore, the pattern 50 formed in the outsole 20 according to a preferred embodiment of the present disclosure has beautiful color in three dimensions and presents the beautiful color when viewed in any direction.

In addition, as the dye 40 fixed to the three-dimensionally interconnected micropores 28 is fixed like a binder, the fixation of the dye 40 is further enhanced.

Hereinafter, a process of manufacturing the outsole 20 in which a pattern 50 having a beautiful color and improved durability is formed will be described with reference to FIG. 4.

Figure 4:
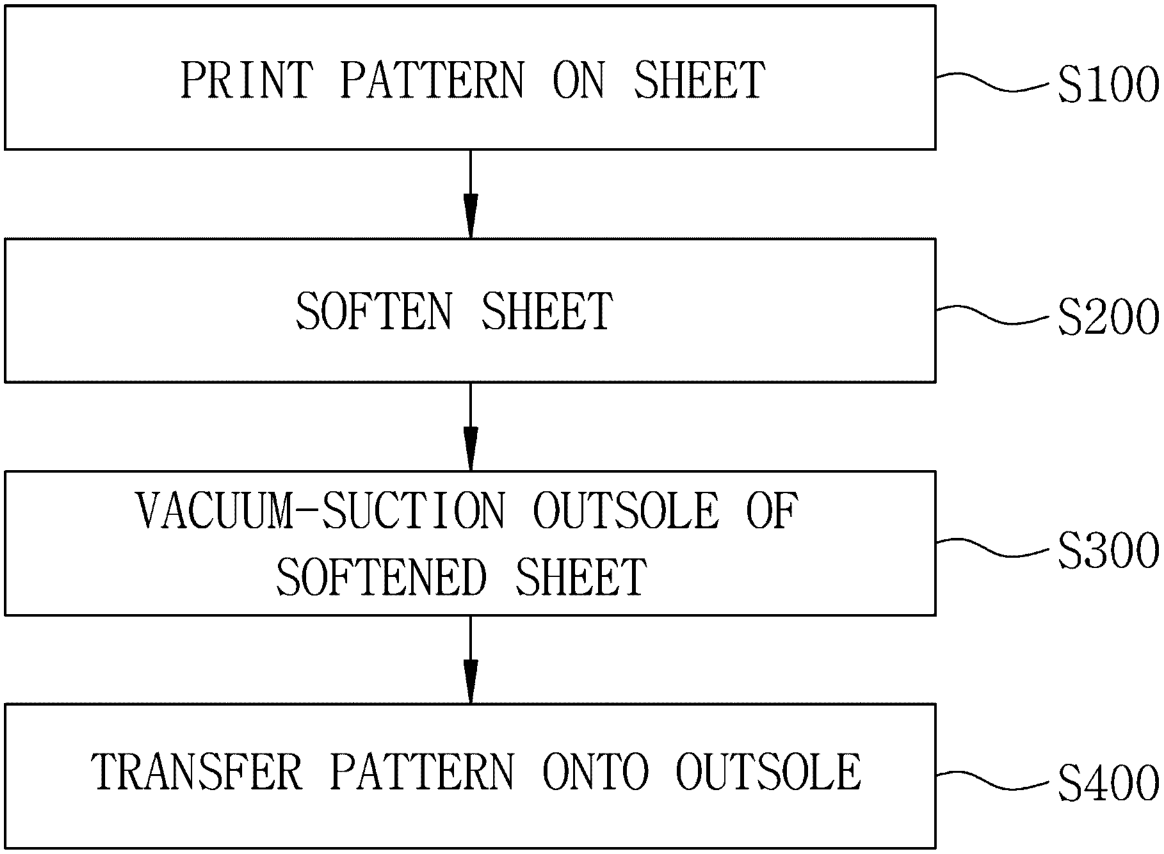
FIG. 4 is a flow chart illustrating a process of forming a pattern with improved quality and durability in an outsole having a three-dimensional shape according to a preferred embodiment of the present disclosure.

That is, FIG. 4 is a flowchart illustrating a process of forming a pattern with improved quality and durability in an outsole having a three-dimensional shape according to a preferred embodiment of the present disclosure, and the process largely includes printing a sheet in operation S100, softening the sheet in operation S200, vacuum-suctioning an outsole of the softened sheet in operation S300, and fixing a pattern on the outsole in operation S400.

According to a user's selection, pre-heating a vacuum suction device (not shown) may be further included before the operation S200 of softening the sheet among the operation S100 of printing a sheet in, the operation S200 of softening the sheet, the operation S300 of vacuum-suctioning an outsole of the softened sheet, and the operation S400 of fixing a pattern on the outsole.

The operation S100 of printing a sheet includes painting, using a dye, a pattern 50 on the outsole 20 on a sheet formed of a thermoplastic resin in a thin plate shape. The printing of the pattern using the dye may be implemented in various ways including digital-printing.

Next, the operation S200 of softening the sheet is included. In the operation S200 of softening the sheet, a pattern-painted sheet is placed on the outsole 20 formed of a transparent or translucent material ad is then softened using a heating device.

The reason for softening the sheet is that since the outsole 20 has a three-dimensional shape, the sheet must be softened so that the sheet can have flexibility and can be attached to the surface of the outsole 20 having a three-dimensional shape in close contact to match the shape of the outsole 20.

Next, the operation S300 of vacuum-suctioning the outsole of the softened sheet includes attaching the softened sheet in close contact with the surface of the outsole 20 surface to match the same using a vacuum suction device.

In the operation S300 of vacuum-suctioning the outsole of the softened sheet, the surface of the softened sheet surface and the surface of the outsole 20 surface are closely attached through vacuum to the softened sheet and the outsole 20 which are placed in a closed space.

In this case, depending on the user's selection, the operation S300 of vacuum-suctioning the outsole of the softened sheet may be divided into operation S300 of primarily vacuum-suctioning the outsole of the softened sheet and operation S300 of secondarily vacuum-suctioning the outsole of the softened sheet.

That is, the operation S300 of primarily vacuum-suctioning the outsole of the softened sheet includes slowly attaching the softened sheet to the surface of the outsole 20 with a low vacuum pressure to completely attach the softened sheet to the surface of the outsole 20 and completely removing air from a vacuum chamber.

Next, in the operation S300 of secondarily vacuum-suctioning the outsole of the softened sheet, when the inside of the vacuum chamber is in a complete vacuum state, the dye 40 is permeated through a high vacuum pressure into the micropores inside the surface of the outsole 20 to a depth of 0.08 mm to 0.12 mm.

Next, in the operation S400 of fixing a pattern on the outsole, the dye 40 is fixed to the micropores 28 at a high temperature after the dye 40 is permeated by 0.08 mm to 0.12 mm into the micropores 28 on the surface of the outsole 20 through the high vacuum pressure as described above.

In operation S400 of fixing the pattern on the outsole, a user may optionally include a thermal convection step or a dye drain step for fixing the dye 40 at a constant depth on the entire surface of the outsole 20.

The process of manufacturing the pattern 50 of the outsole 20 according to a preferred embodiment of the present disclosure improves the effect of forming the pattern 50 through the above-described process and forms the beautiful and three-dimensional pattern 50.

Although a preferred embodiment of the present disclosure have been described above, various changes, modifications and equivalents may be used in the present disclosure. Therefore all changes and modifications that fall within the meets and bounds of the claims, or equivalences of such meets and bounds are therefore intended to be embraced by the appended claims.

What is claimed is:

1. A method of manufacturing an outsole of a three-dimensional shape with improved pattern quality and durability, the method comprising:

printing a pattern on a sheet formed of a thermoplastic resin using a dye;

placing the sheet on the outsole and softening the sheet using a heating device;

vacuum-suctioning the outsole of the softened sheet, which includes primarily vacuum-suctioning the outsole of the softened sheet and secondarily vacuum-suctioning the outsole of the softened sheet; and fixing a pattern on the outsole at a high temperature with the dye permeated to micropores on a surface of the outsole, wherein the primarily vacuum-suctioning the outsole of the softened sheet includes slowly attaching the softened sheet to the surface of the outsole with a low vacuum pressure, and wherein in the secondarily vacuum-suctioning the outsole of the softened sheet, the dye is permeated into the micropores inside the surface of the outsole with a high vacuum pressure.

* * * * *